United States Patent [19]

Rando et al.

[11] Patent Number: 4,912,851

[45] Date of Patent: * Apr. 3, 1990

[54] LEVEL/PLUMB INDICATOR WITH TILT COMPENSATION

[75] Inventors: Joseph F. Rando, Los Altos Hills; Henry L. Schwartz, Los Gatos, both of Calif.

[73] Assignee: Spectra-Physics, Inc., San Jose, Calif.

[*] Notice: The portion of the term of this patent subsequent to Aug. 1, 2006 has been disclaimed.

[21] Appl. No.: 215,678

[22] Filed: Jul. 6, 1988

Related U.S. Application Data

[63] Continuation-in-part of Ser. No. 179,510, Apr. 8, 1988.

[51] Int. Cl.$^4$ .................... G02B 7/14; G01B 11/26
[52] U.S. Cl. ................... 33/227; 33/DIG. 21; 356/138
[58] Field of Search ......... 33/227, 228, 250, DIG. 21; 356/250, 149, 138

[56] References Cited

U.S. PATENT DOCUMENTS

| | | | |
|---|---|---|---|
| 3,729,266 | 4/1973 | Mason et al. | 356/250 |
| 3,856,409 | 12/1974 | Ginrich et al. | 356/250 X |
| 3,897,637 | 8/1975 | Genho | 33/227 |
| 4,333,242 | 6/1982 | Genho et al. | 33/227 |

Primary Examiner—Harry N. Haroian
Attorney, Agent, or Firm—Donald C. Feix; Paul Davis; T. M. Freiburger

[57] ABSTRACT

A tool for use in establishing a precise level line or plumb line or line for alignment uses a visible laser diode for projecting the line. The tool is relatively small and compact, drives the laser diode using batteries contained in the tool, and includes tilt compensation for use on surfaces which are not level, up to about 5° off level, for still delivering a truly plumb or truly horizontal beam. A manual selector device is provided for shifting the beam from a vertical orientation to a horizontal orientation when desired. Specific forms of tilt compensation apparatus are disclosed.

19 Claims, 7 Drawing Sheets

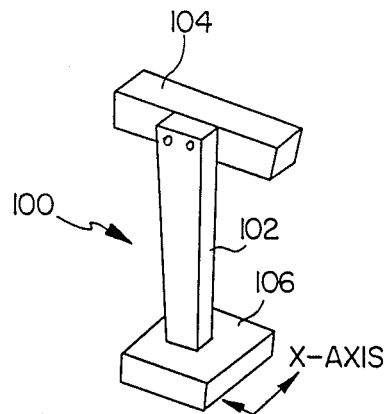
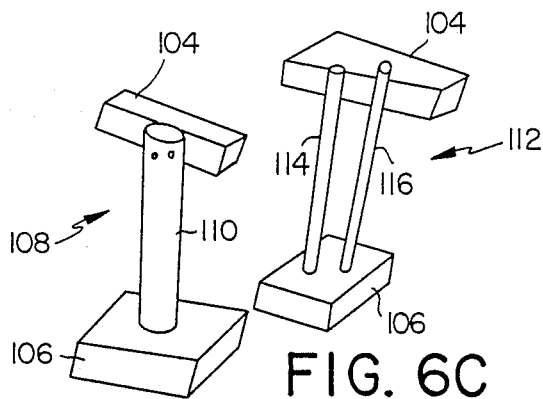
FIG. 6A   FIG. 6B   FIG. 6C
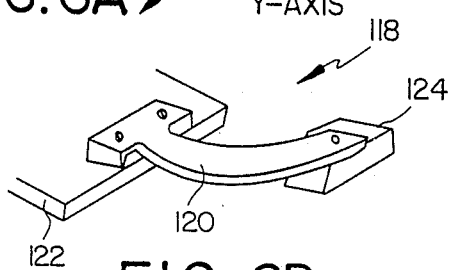
FIG. 6D
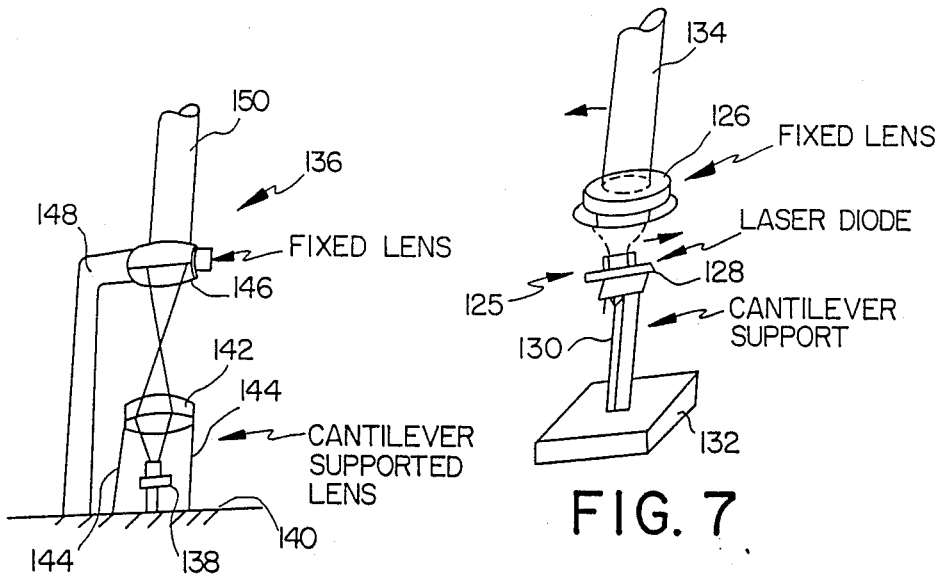
FIG. 8   FIG. 7

LEVEL/PLUMB INDICATOR WITH TILT COMPENSATION

REFERENCE TO RELATED APPLICATION

This application is a continuation-in-part of U.S. application Ser. No. 07/179,510, filed Apr. 8, 1988.

BACKGROUND OF THE INVENTION

The invention is generally in the field of hand tools, and is more particularly concerned with a hand tool for use in relatively precise plumbing and leveling operations, such as for use in carpentry or building layout.

There have been a variety of survey and carpentry tools which have employed lasers. For example, see U.S. Pat. Nos. 3,897,637, 3,771,876, 4,221,483 and 4,679,937.

In U.S. Pat. No. 3,897,637, there is disclosed a level and squaring tool utilizing a helium-neon laser for projecting a beam both vertically and horizontally. The device was not self-leveling and required manual leveling. It was rather large and required connection to an external source of power.

Pat. No. 3,771,876 was directed to a laser apparatus for producing a plane or conical optical reference surface. The device used a pendulum hanging from a flexible suspending member, with the pendulum containing the light source so as to be self-leveling. A double mirror or prism device was used for reflecting the beam out of the device 90 degrees from the entry angle of the beam from the pendulum. The double mirror (sometimes called a pentaprism) device was fixed in the unit and allowed for changes in the angle of the approach of the light beam from the pendulum.

Rando Pat. No. 4,221,483, assigned to the assignee of the present invention, discloses a laser beam level instrument using the principle of translation of a lens which collimates a laser diode beam in order to compensate for small degrees of tilt in the instrument. The collimating lens is suspended as a pendulum and has the effect of maintaining the collimated beam in a truly vertical position providing self-leveling in a limited range of movement of the instrument.

U.S. Pat. No. 4,679,937, also assigned to the same assignee as the present invention, discloses a self-leveling battery-powered surveying tool. The tool, which is designed to be set up on a tripod, provides a reference for leveling and alignment. The apparatus, which includes a laser diode as a light source for projecting a generally horizontal but, non-planar cone of light from a reflecting cone, includes a tilt compensation arrangement relevant to the present invention. The reflecting cone is suspended by a wire having a controlled stiffness which allows the mirror cone to tip at an angle which is one-half the angle of tilt error of the instrument from true plumb.

A contractor's tool for referencing a chosen elevation at a building site was marketed in the 1970s as Model 840 Building Laser, by the assignee of the present invention. The product also was capable of emitting a vertical beam. It had a helium-neon laser and was powered by an internal battery. The device was not self leveling.

None of the devices or systems disclosed in these previous patents provided a tool that was capable of the level, plumb, and alignment functions of the present invention described below, particularly as embodied in a small package with onboard battery powering of a visable laser diode and with a simple and reliable tilt compensation means. These are objects of the present invention as described below.

SUMMARY OF THE INVENTION

The present invention achieves these objectives in a small and compact level, plumb and alignment tool which may be approximately the size of a small carpenter's level. The compact housing of the tool holds batteries connected to a visable laser diode, the light output of which is processed by optics effective to compensate for tilt errors in the positioning of the tool on a surface, such as a non-level section of floor. Preferably, the compensation means will effectively compensate for tilt errors of up to about 5 degrees, still projecting a beam from the tool in substantially true vertical or true horizontal orientation.

Any of a number of types of compensation means can be used in the tool, but the compensation means is most preferably one which is simple, easily calibrated, reliable, and providing a light beam whose origin is as close as possible to the bottom of the unit's housing. This is to assure that bottom reference marks or notches on the tool are subjected to as little error as possible from the true location of the vertical beam as a result of unit tilt.

In a specific embodiment the compensation means may comprise a cantilevered two-axis flexible band device, having separately controllable flexure stiffness in two different orthogonal directions. A weight is suspended from the flexible band device and the weight has obliquely mounted on it a mirror which receives a collimated beam from the laser diode and redirects the beam to substantially true vertical orientation. The compensation device corrects for tilt of the instrument essentially by permitting the mirror surface to change angle orientation by about one-half the amount of tilt to which the unit is subjected. The compensation considerations are different for tilt in the plane of the beams incident and reflected from the mirror, versus tilt in a transverse plane. In the transverse plane more mirror tilt correction is needed, since the laser diode beam approaches the mirror from an oblique angle.

Another, more preferred embodiment of the compensation means employs a wire or rod of uniform cross section in place of the two-axis flexible band. The wire corrects for tilt in the plane of the incident and reflected beams; the shortfall in compensation in the orthogonal plane is compensated for by a negative cylindrical lens which increases the angular correction in this latter plane.

Other types of compensation means may be used in the instrument of the invention, including lateral translation of a light source in response to tilt of the tool, using a lens which effectively reverses the direction of tilt of the beam from vertical. A cantilever supported diode can be positioned beneath a fixed-position lens, with the divergent light from the diode collimated by the lens. When the diode translates in one direction from tilt of the instrument, a portion of its diverging light will still be collected by the lens and collimated, but in a compensating, reversed direction from the angle of tilt, thereby keeping the projected beam in true vertical.

Cantilever supported lens arrangements can also be used for compensating for instrument tilt. In this case, a second, fixed lens is required to reverse the direction of correction effected by the first lens, which is a focusing lens.

The suspension arrangements of the tilt compensator apparatus act as a shock absorbing means for the tool. This is particularly true where a weight or pendulum is supported on a flexure member from a cantilevered arm. The arm can bend elastically when the tool is dropped, absorbing the shock without damage.

A horizontal beam can be generated from the vertical beam in the tool of the invention, by using a penta prism or equivalent two-mirror deflector. A manual knob or other operator control can be included for use by the operator in positioning the deflector over the beam when a horizontal beam is needed. The horizontal beam will stay in substantially the true horizontal because of the compensating means, in spite of tilt errors of the instrument within a limited permissible range.

The projected light beam size is small enough to allow visible location of the spot center without the need of any special electronic detector, and large enough to avoid rapid spreading by diffraction. For a useful working range of zero to ten meters, a beam size of 1 millimeter to 5 millimeters is preferable.

The tool may also include an out-of-level indicator to indicate to the user when the tool is tilted beyond the useful range within which the compensator is effective. This may comprise a window with a frosted annular region. Alternatively a gravity-actuated switch may be included, for turning off the laser and indicating to the user when the unit is too far out of level.

Conventional level vials may be included in the exterior walls of the housing, to improve the utility of the instrument and to eliminate the worker's need for a small level of the type ordinarily carried in a tool box. The level vials are positioned in places where they will not mislead the operator to the impression that the instrument must be level before it can be used.

The tool may also include a time-on switch, which energizes the unit for a predetermined period of time whenever turned on by the operator, then shuts it off automatically. The housing can include a shutter to protect the laser beam exit window.

It is therefore among the objects of the invention to provide a plumb, level and alignment tool which is small and compact, with onboard batteries powering a visible laser diode, which has effective tilt compensation within a useful limited range and which has other features assuring adequate accuracy, all in a tool approximately the size of a small conventional level.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIGS. 6A through 6D show alternative forms of tilt compensation component structure for the apparatus shown in general in FIGS. 3 and 4.

FIG. 7 is a schematic perspective view showing another form of tilt compensation with a movable laser diode.

FIG. 8 is a schematic elevation view illustrating a further form of tilt compensation with a movable lens.

DESCRIPTION OF PREFERRED EMBODIMENTS

Figure 1:
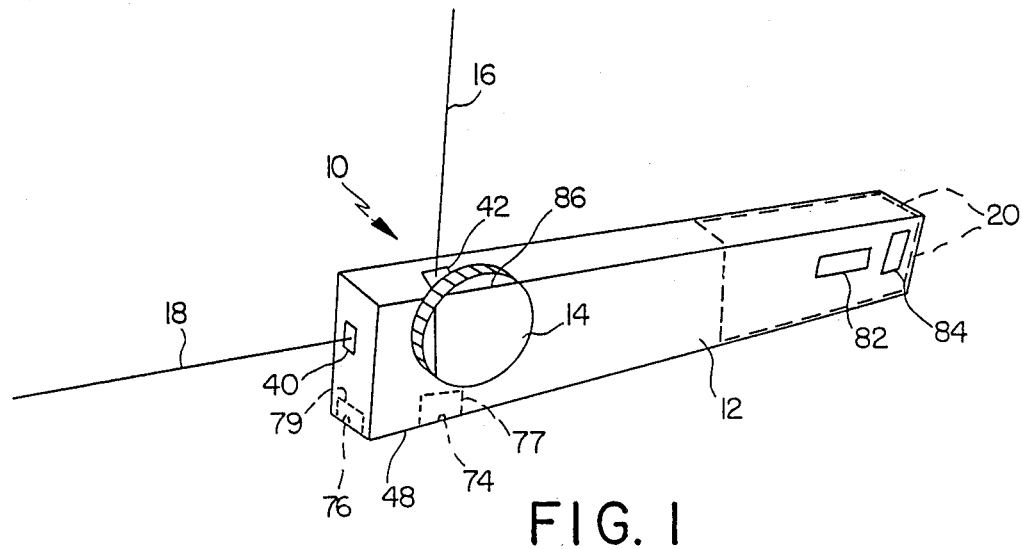
FIG. 1 is a perspective view of a compact tool in accordance with the invention for leveling, plumbing and alignment operations.
Figure 2:
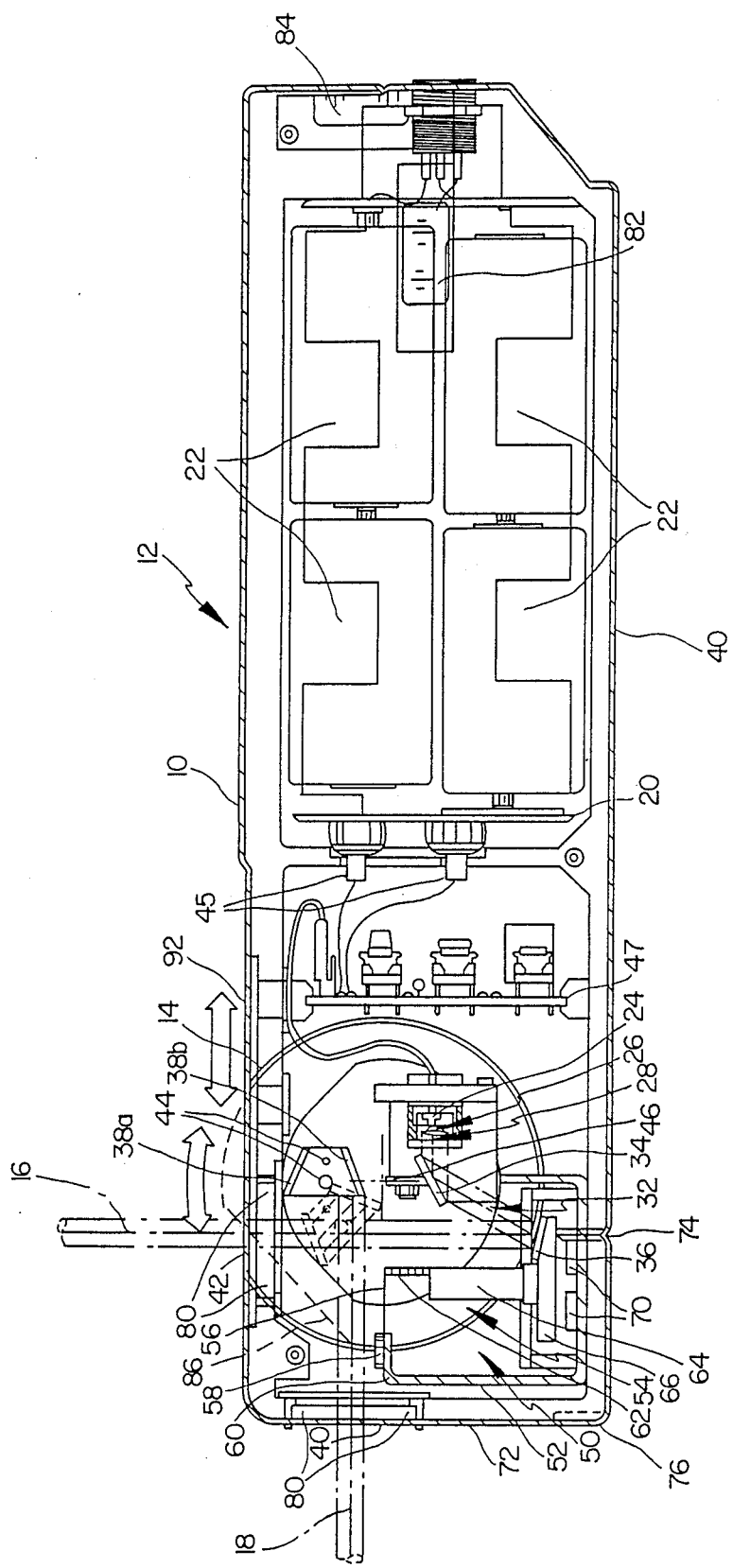
FIG. 2 is a sectional view in elevation of the tool of the invention, showing the interior of the tool's housing and indicating beam optics, tilt compensation, function selection and onboard batteries within the tool.

In the drawings, FIGS. 1 and 2 show a level/plumb and alignment indicator 10 having a housing 12 generally in the shape of a small carpenter's level. A manually operable dial 14 preferably extends from the housing 12 in a position to be rotated by an operator so as to select between the projection of a vertical laser beam 16 and a horizontal laser beam 18 from the tool. Also included in the housing 12 is a battery compartment 20 containing a series of battery cells 22 which supply power to drive a laser diode 24.

The laser diode 24 emits light in the visible range, which may be red light having a wavelength of about 600 to 680 nanometers. The light emitted from the diode 24 and indicated at 26 is divergent and is collimated by a convex collimating lens 28. In this particular embodiment, the collimated beam of light 32 is then reflected obliquely downwardly by a mirror 34 and then vertically upwardly by another oblique mirror 36 to project the vertical beam 16 from the tool 10. The mirror 36 may be called a final reflecting mirror (including in the claims), since it is the mirror that corrects the beam to true vertical (even though this vertical beam may be turned horizontal by further reflectors).

If the horizontal beam 18 is desired, as for leveling operations or some forms of aligning operations, the manual dial 14 is rotated, counter-clockwise as viewed in FIG. 2, to position a pentaprism or equivalent 45° mirror pair 38a, 38b into the path of the vertical beam 16. This puts the mirror pair in the position shown in dashed lines in FIG. 2, so that the vertical beam 16 reflects off the mirror 38a, then off the mirror 38b and then horizontally out of the tool through a horizontal beam window 40 as indicated.

When the beam is projected vertically, as for plumbing operations, the beam 16 emerges from a vertical beam window 42 at the top of the tool 10.

The mirror pair 38a, 38b preferably is mounted on the pivotable manual dial 14 by appropriate fasteners 44, and the dial 14 itself is mounted for pivoting about a central axis 46 with respect to the housing 12.

FIG. 2 also indicates battery connectors 45 and a circuit board 47 with control electronics, connected to the battery connectors 45 and the laser diode 24.

The housing 12 of the tool of the invention is compact, generally about the size of a small carpenter's level. Its overall length may be about 9 inches. The housing's width may be about 1.7 inches, (preferably less than 2 inches) and its height about 2.6 inches (preferably less than 3 inches). As indicated in FIGS. 1 and 2, the manually rotatable dial 14 may be positioned on the side of the tool, although it could also be positioned inside the housing with only an upwardly extending arc of the dial, as can be seen in FIG. 2, exposed.

An important feature of the invention is its compactness and portability. As illustrated in FIG. 2, the battery cells 22 are contained compactly in the housing, and the use of the laser diode 24, as opposed to other types of lasers, saves a great deal of space and weight in the tool 10. In a tool designed for the uses of the present invention it is a very important concern that the tool not be in any way cumbersome, unwieldly or difficult to use, as well as not being too large for a tool box or belt or garment type tool carrier. The present invention addresses all of these concerns in a small, efficient and accurate tool of relative simplicity.

Another important feature of the invention is that the leveling, aligning and plumbing tool 10 includes a self leveling or tilt compensation means so that, within a limited effective range, the tool will project a vertical beam 16 which is substantially truly vertical or a beam 18 which is substantially truly horizontal, in spite of a lack of levelness of a floor or other surface on which a bottom face 48 of the housing is placed. As discussed above, any of several types of tilt compensation systems can be used, but a preferred tilt compensation arrangement is illustrated in the drawings.

The tilt compensation apparatus, generally identified by the reference number 50 in the drawings, includes a frame 52 which is fixed to the interior of the housing 12. The fixed frame 52 supports the laser diode 24, the collimating lens 28 and the first oblique mirror 34, all in fixed position and orientation.

Figure 3:
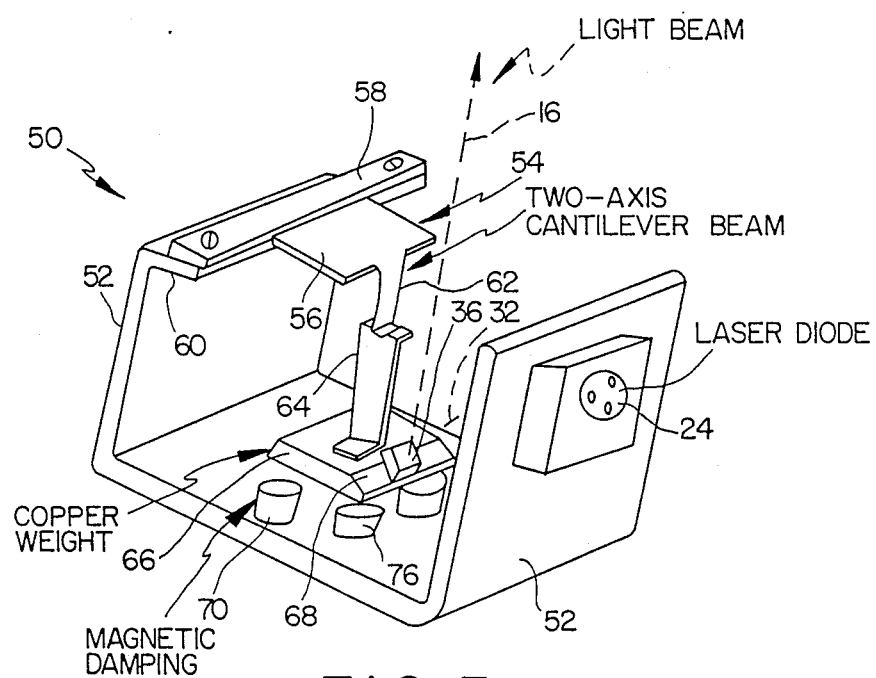
FIG. 3 is a perspective view showing one form of tilt compensation system which may be corporated in the tool of the invention.
Figure 4:
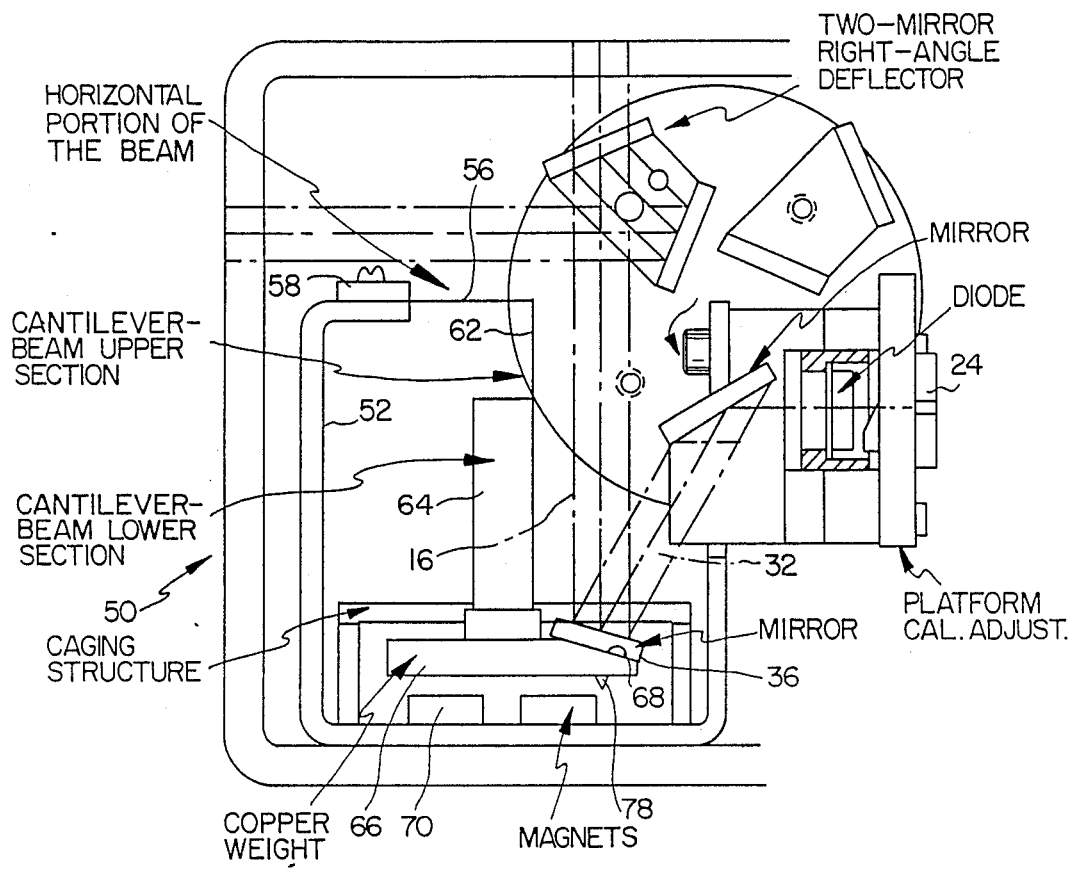
FIG. 4 is an elevation view in section showing a portion of the tool as illustrated in FIG. 2, with further details of one example of beam optics and level compensation which may be included in the tool.
Figure 5:
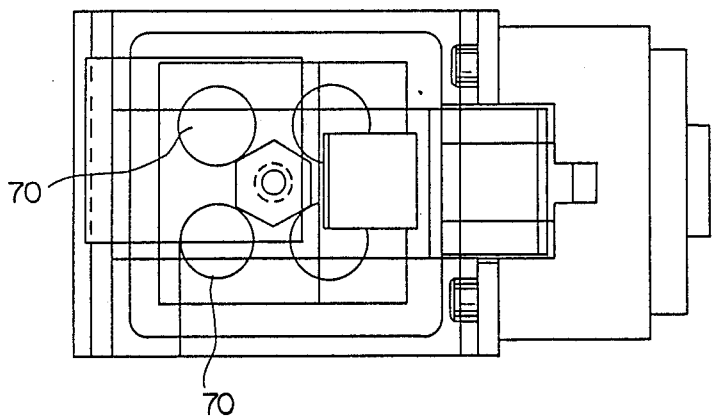
FIG. 5 is a plan view, somewhat schematic and in section, as seen along the line 5—5 in FIG. 4.

Further details of the self-leveling or tilt compensation system 50 are shown in FIGS. 3, 4 and 5, which should also be viewed in conjunction with FIG. 2. The frame 52 supports a gravity-responsive pendulum device 54 on which the oblique, vertically-reflecting mirror 36 is mounted. The tilt compensating device 54 has a generally horizontal cantilever plate 56 which, as shown in the drawings, may be fixed to the frame 52 by means of a screwed down bar or plate 58 which sandwiches a base end of the cantilever plate 56 against a top flange 60 of the frame.

The cantilever plate 56 is integral with a two-axis flexure band depending from the plate 56 and comprising an upper flexure band 62, bendable in the plane of the incident/reflected light beam 32, 16, and a lower flexure band 64 which is bendable in an orthogonally transverse plane. The upper and lower flexure bands 62 and 64 preferably are integral, although they could be secured together by appropriate fasteners, welding or adhesive.

Connected to the lower end of the lower flexure band 64 is a weight or weighted platform 66 which may be, for example, of copper metal. To this weighted platform the oblique mirror 36 may be fixedly secured, as on an appropriately angled facet 68 of the platform as shown.

Below the weighted platform 66 preferably are positioned a series of magnets 70 for magnetic damping of the motion of the pendulum assembly 54, although other forms of damping such as air damping could be used as an alternative. As is well known, the magnets 70 in close proximity to the upper platform 66 will induce eddy currents in the copper 66 due to motion of the copper body 66 over the magnets, and these currents will be compensatory to the direction of motion of the swinging pendulum, damping the swinging motion.

In this preferred embodiment, the collimated beam of light 32 from the diode laser 24 and the collimating lens 28 is reflected obliquely downward from the mirror 34 toward the small mirror 36 mounted on the pendulum assembly 54. As the base or bottom surface 48 of the tool 10 is tilted, the pendulum 54 tilts by a smaller amount depending on the stiffness on the axis of the flexure band supporting the pendulum. Successful compensation for tilt depends on tilting the mirror 36 the correct amount for the degree of tool tilt.

In the plane of the light beam, i.e. of the incident and reflected radiation 32, 16 with respect to the mirror 36, the mirror 36 must tilt an amount equal to half the tool tilt to ensure that the projected beam 16 remains vertical. This is because in this plane, there is a two-to-one relationship between light beam angular deflection and mirror tilt.

However, in the plane perpendicular to the plane of the light beam, i.e. the plane of flexure of the lower flexure band 64, the mirror 36 must tilt to a greater extent to maintain the light beam 16 vertical (depending on the angle of approach of the incident beam 32). The stiffness in each axis is determined by the flexure band dimensions. The upper flexure band 62 bends substantially in the plane of the light beam, while the lower flexure band 64 bends substantially in the perpendicular dimension. In this perpendicular plane the light beam motion to mirror motion is $$\frac{\sin 2a}{\sin a}$$

where "a" is the angle between the incoming beam and the normal to the mirror. For example, the factor is 1.3:1 for a 30° included angle as compared to a 2:1 relation for the other axis or plane.

In this embodiment an approximation is made to the effect that any tilt of the tool can be divided into two orthogonal directions, and that the corresponding flexure band deflections are such that the projected beam remains substantially vertical.

Therefore, the upper flexure band 62, in combination with the cantilevered plate 56, undergoes less gravity-responsive bending than the lower flexure band 64. The flexure band 62 and horizontal plate 56 are calibrated, in conjunction with the remaining connected apparatus, to essentially respond in the two-to-one relationship mentioned above.

The cantilevered horizontal plate 56, a thin sheet metal plate, is generally horizontal to allow shock mounting. Thus, a large, vertical acceleration will not strain this upper support 56 but will deflect the horizontal plate, causing it to flex downwardly toward the magnets 70.

For a brass flexure band/pendulum assembly, the cantilevered horizontal plate may have dimensions of about 0.2 inch in overhang ×.003× at least about .2 inch; the upper flexure band 62 may have dimensions of about .2×.003×.315 inch; and the lower flexure band may have dimensions of about .2 ×.003×.675 inch. The copper weight platform 66 may weigh about 6 grams.

It is an important feature of this embodiment of the invention that the tilt compensation device 50 is easily calibrated. To achieve the correct amount of compensation in both axes, i.e. in the plane of the incident and reflected beams 32, 16 and transverse to that plane, two adjustment are required. First, the out-of-plane compensation is adjusted by adding weight to the weighted platform 66. Second, the in-plane compensation is adjusted by increasing or decreasing the amount of horizontal overhang, or the degree of cantilever, in the cantilevered plate 56. This does not affect compensation in the other plane. With the compensation so adjusted, the final beam directing is accomplished by moving the lens 28 relative to the laser diode 24. Other methods of calibration can include shifting some weight along the cantilever or adding weight along the cantilever or adding weight to the point where the two flexure bands meet, for example.

As discussed above, when the tool 10 of the invention is to be used for a horizontal leveling function, the operator rotates the manually rotatable dial 14 (or other suitable lever or trigger or button, etc.) to a position where the mirror pair 38a, 38b is moved into the path of the vertically oriented beam 16 within the tool, as illustrated by the mirror pair position shown in dashed lines in FIG. 2. The mirror pair, with the mirrors 38a and 38b fixed at 45° to one another, will always redirect the beam 16 at 90°, i.e. horizontally as the output 18, regardless of small variations in the actual position of the mirror pair, i.e. of the manual dial 14 about its axis 46. It should be understood that the mirror pair could be positioned to redirect the beam 16 out through a side of the housing 12, i.e. either the left or right side, rather than through the front end 72 as illustrated. Such an arrangement might be desirable for certain applications of the tool and would require reorienting the dial 14 to rotate about a perpendicular axis to the axis 46 shown in FIG. 2, or simply the mounting of the mirror pair 38a, 38b essentially in a plane at 90° to its plane of movement shown in FIG. 2.

It is important that the operator of the level/plumb tool 10 be able to conveniently sight some position reference marker in order to correctly position the housing 12 of the tool over a line or point on a floor or other surface or to mark a point on the floor (or elsewhere) when the reference beam has been located onto a distant reference point. As shown in FIGS. 1 and 2, such a reference marker may comprise a notch 74 in the side of the housing 12 at the bottom of the tool, and the notch may traverse the entire width of the tool along its bottom. A similar notch 76, shown in FIG. 1, may be provided at the bottom front of the tool, centered on the location of the beam 16 as seen from the front end of the tool.

It is very important for accuracy that the notch 74 or other sightable reference marker be closely aligned with the actual position of the vertical beam 16 in the tool 10. When the tool 10 rests on a surface which is perfectly level, this is not a problem, the compensator device 50 being set up so that the beam 16 is centered directly over the notch 74 (and the notch 76). However, if the surface is substantially tilted, even within the permissible range of about 5° for which the tool 10 is designed, this will shift the alignment of the beam 16 away from the reference markers due to the reorientation of the vertical beam 16 non-perpendicular to the bottom 48 of the tool, causing the apparent source of the vertical beam 16 to be shifted to a different position on the bottom of the housing. Thus, on such a substantial tilt, if the operator locates the reference notch 74 along a line on a floor, the actual location of the vertical laser beam 16 will be slightly laterally displaced.

This error situation can be minimized by locating the reflecting mirror 36 as close as possible to the bottom of the tool, i.e. as close as possible to the reference mark 74. In preferred embodiments of the invention, the reflecting surface preferably is within one-half inch of the bottom 48 of the tool.

Therefore the maximum error in lateral shift that could occur due to mirror tilt within the limits of permissible operation of the tool would be one-half inch X tangent 5°, or about .044 inch. The error can be further reduced by moving the reflecting surface of the mirror 36 even closer to the bottom 48 of the tool, down to about one fourth inch or less from the bottom. This can be accomplished, for example, by locating the reflecting surface of the mirror 36 at its bottom, by minimizing the thickness of the pendulum weight 66, and by minimizing the thickness of the bottom of the tool's housing, of the base portion of the compensator frame 52, of the damping magnets 70 and of the space between the magnets 70 and the pendulum weights 66.

An alternative solution to this problem is to provide a viewing window in the side of the housing, in lieu of or in addition to the reference notch 74 shown in FIG. 2. Such a viewing window, indicated in dashed lines at 77 in FIG. 2, can reveal the position of an arrow or pointer 78 extending from the bottom of the pendulum weight 66 as indicated in FIG. 4. The arrow 78 can reduce the error by about half, as compared to using a mark on the outside of the housing. A similar window 79 (FIG. 1) can be located at the bottom front of the housing.

It is important to prevent the user of the tool 10 from obtaining an inaccurate plumb or horizontal line, by indicating to the operator when the compensator is out of its useful range, or by otherwise preventing the tool from being used when the housing is tilted to the extent that the weight platform 66 of the compensator is out of the region within which an accurate plumb line can be generated.

In a preferred embodiment of the invention, this is accomplished by including a frosted annular region 80 on the window 42 at the top of the tool, and a similar region 80 on the window 40 at the front end of the tool. When the tool housing is within the accurate region, which may be within 5° of level, the vertical beam 16 will pass through a central clear region of the vertical exit window 42. When the housing is out of this useful range, the beam 16 strikes the frosted region 80 and provides a visual warning to the operator that the unit should not be used. The operator sees the visible beam being scattered by the frosted region 80, and he sees the strength of the projected vertical beam 16 being weakened as the tilt error increases.

For still larger angles, the user is prevented from using the device because no beam is projected, being blocked by opaque regions around the window 42.

The condition of being beyond the useful range of the tool can be indicated in another way. A gravity-actuated switch may be included, to turn off the laser and indicate to the user that the unit is too far out of level. A mechanical pendulum or steel ball rolling in a groove could also be used as an indicator of the out-of-range condition.

Conventional level vials can be included in the tool 10 to improve the usefulness of the instrument and to replace a small conventional carpenter's level ordinarily carried in the tool box. Thus, a horizontal level vial 82 (FIGS. 1 and 2) may be included on or in a side of the housing 12 for conventional leveling operations. A vertical-level bubble or vial 84 can also be included, oriented at 90° as illustrated in FIG. 2, so that the tool can be used for conventional plumb indication. The location of the level vials, particularly the horizontal vial 82, preferably is so as not to confuse the operator into believing that these vials must be used to level the tool 10 before using it in its laser beam functions. Therefore, the horizontal level vial 82 may be positioned such that the level bubble is not visible when the tool is set up for laser beam plumbing use as indicated in the drawings, but only comes into view when the tool is laid flatly against a horizontal surface, i.e. turned over onto its side.

The manual selector dial 14 (or other appropriate manual selector device) preferably also serves to switch the tool on or off. Thus, as shown in FIG. 2, the off position of the tool can be represented by the rotatable dial 14 in the position illustrated. A flat portion 86 can be included on the dial, visible from the side of the tool, to indicate the function to be selected. Thus, if the manual dial 14 is rotated back, or clockwise as seen in FIG. 2, the flat 86 is vertical, indicating a vertical function or plumbing function. When the wheel 14 is rotated in the other direction, the flat 86 will then be in the horizontal position, visually indicating a horizontal function, i.e. the projection of the horizontal beam 18 through the front of the tool.

Both of these movements preferably operate a switch to turn on the laser diode 24 (not shown).

Preferably, the tool of the invention includes a time-on switch instead of a simple on/off switch. The time-on switch turn the unit on for a predetermined, fixed period of time (e.g. 60 or 120 seconds). The switch then shuts off automatically at the end of this time period. This feature has two beneficial effects. First, it will conserve the battery, and second, it will save operator time since the operator need not go back to the tool to turn it off after use.

In the preferred embodiment, a shutter 92 preferably is provided at each window 40 and 42, in order to protect the exit windows from scratches and dirt. To simplify operation, the shutter 92 can be mechanically coupled to the switch or manual dial device 14, so that the unit can be turned on at the same time the shutter is opened.

FIGS. 6A through 6D show other embodiments of tilt compensation devices which can be used in accordance with the invention. In FIG. 6A, there is shown a tilt compensator device 100 in which a wire or very small rod 102 of rectangular cross section is fixed to a frame component 104 at its upper end and to a platform 106 for supporting a mirror (such as the mirror 36, FIGS. 2 and 4) at its other end. The wire or rod 102 (shown not to scale) is larger in one cross sectional direction, i.e. the Y axis shown in FIG. 6A, than in the other cross sectional direction, i.e. the X axis in FIG. 6A. The rod or wire 102 is therefore stiffer in the Y axis direction than in the X axis direction, and a greater degree of pendulum swing will occur for a given tilt in the X direction than in the Y direction. By carefully selecting the cross section of the wire or rod 102, in combination with its length and the weight or the weighted platform 106, correct compensation can be made both in the plane of the incident and reflected beam (the Y axis direction) and in the transverse plane (the X axis direction).

FIG. 6B shows a tilt compensator device 108 similar to that shown in FIG. 6A. However, in this embodiment the wire or rod 110 is round in cross section, but elliptical or oval so that it has greater stiffness in the Y axis direction than in the X axis direction.

FIG. 6C shows another variation 112, wherein a pair of rods or wires 114, 116 are used to connect the frame member 102 to the depending pendulum weight 106. The wire gage, the spacing between the two wires 114 and 116, and their length, orientation and the weight of the weighted platform 106 can again be manipulated to achieve the correct degree of compensation in each of the X axis and Y axis directions.

FIG. 6D shows another embodiment of a tilt compensator device 118, wherein a curved or arcuate flexure band 120 is supported in generally horizontal orientation from a frame member 122. The mirror-supporting weighted platform 124 is at the other end of this arcuate thin flexure member 120. It can be seen that the dimensions of the flexure band 120 can be manipulated so as to provide greater tilt compensation in the X axis direction than in the Y axis direction, to correctly compensate for an obliquely approaching beam 32 as illustrated in FIGS. 2 and 4.

FIG. 7 shows another embodiment of a tilt compensation device 125 which may be included in the apparatus of the invention. In this embodiment, a positive lens 126 is held in fixed position over a laser diode 128 which is movable laterally with tilt of the tool 10, responsive to gravity. The laser diode 128 is supported at the upper end of a cantilevered generally vertical flexure rod 130, the lower end of which is fixed into a portion 132 of the housing of the tool, or the portion 132 may be a base fixedly attached to the housing.

In this embodiment, the laser diode's lateral shift under the force of gravity, due to tilt of the base 132 (and the housing 12 of the tool) causes the source of the laser light to be laterally shifted relative to the lens 126. Since the laser light from the diode 128 is divergent, and must be collimated by the fixed convex lens 126, the lens will have the dual effect of correcting the orientation of the vertically projected beam 134 under out-of-level conditions, and of collimating the light beam. The degree of lateral shifting of the diode 128, which responds to tilt, can be calibrated to precisely compensate for such tilt. The lens 126 reverses the direction of movement of the light source, i.e. the diode 128, which is what is required to compensate for the tilt angle of the tool. When the laser diode 128 shifts laterally under tilt condition, some of its divergent light then escapes collimation by the lens 126, so that a slightly different collection of the laser light is used to form the beam 134 when the tool is tilted.

FIG. 8 shows schematically another embodiment of a tilt compensator 136 in accordance with the invention. In this embodiment, a laser diode 138 is fixed in position on a housing portion 140 as illustrated, but a convex lens 142 above the diode is supported on generally vertical flexure support legs 144 so as to be laterally movable in response to tilt of the tool. A fixed lens 146 is supported in a fixed position on a frame 148 above the lens 142, so as to collect the light from the lens 142 and collimate it into a truly vertical beam 150. As illustrated in FIG. 8, the laser light image is reversed by passing through the first convex (positive) lens 142. The effect is that, as the first lens 142 moves in one direction due to tilt, the converging light emerging from the lens 142 tilts in the same direction that the lens 142 is tilting. The second lens 146 reverses the direction of this tilt to form the collimated beam 150, and it is apparent that this apparatus 136 can be correctly calibrated to accurately compensate for out of level conditions of the tool.

Figure 9:
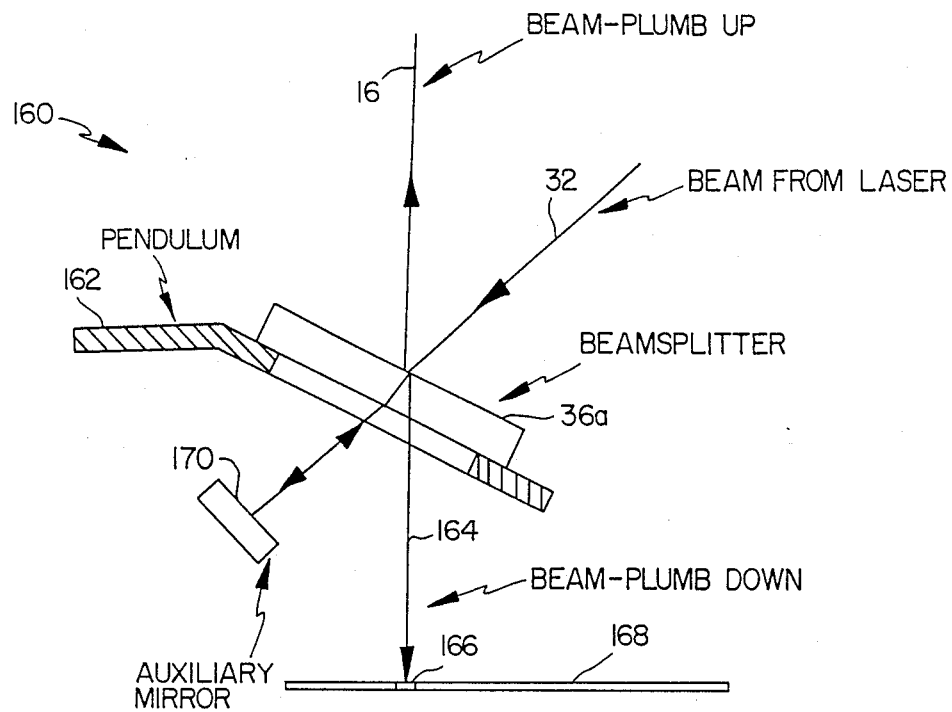
FIG. 9 is a sectional view showing a portion of a tilt compensation system having a modification whereby an auxiliary reference beam helps visually locate the tool precisely over a point.

FIG. 9 illustrates a modification of the tilt compensation mechanism shown in FIGS. 2 through 5, and is also applicable to FIGS. 6A through 6D. The purpose of the arrangement shown in FIG. 9 is to achieve still further accuracy in the location of the tool with respect to a position on a floor or other surface, in spite of the tool's being out of level by up to 5 degrees.

FIG. 9 shows a portion 160 of a modified tilt compensation arrangement wherein a mirror 36a is mounted on a weight or pendulum 162. The mirror 36a is a beam splitter mirror, reflecting most of the incident laser beam 32 upwardly as a truly plumb beam 16, but directing a small amount of the light as a downwardly directed locating beam 164 which is also truly plumb. The beam 164 can be positioned precisely on a spot 166 on a floor or other surface 168, or the spot 166 can be located and marked using the locating beam 164.

The beam splitter mirror 36a transmits a small portion of the incident light 32, which strikes an auxiliary mirror 170 behind the mirror 36a. The light reflected back from this mirror 170, as illustrated in FIG. 9, is reflected off the back side of the beam splitter mirror 36a, to become the plumb locating beam 164.

It should be understood that the arrangement shown in FIG. 9 can be used in place of the tool locating notches 74 and 76 and in lieu of the viewing windows 77 and 79, provided the bottom front portion of the housing 12 is cut away to allow visual access to the locating beam 164.

Figure 10:
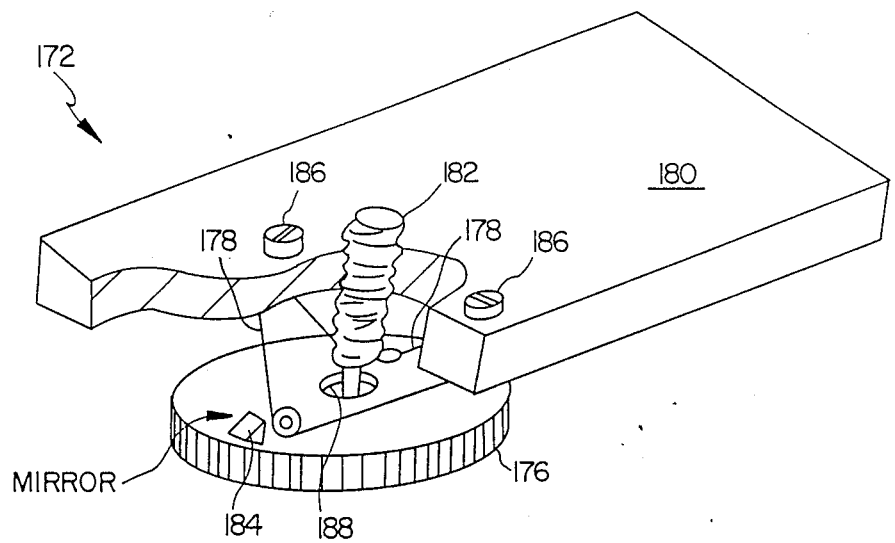
FIG. 10 is a schematic view in perspective showing a portion of a further embodiment of a tilt compensation system wherein a pendulum weight is supported by four wires.
Figure 11:
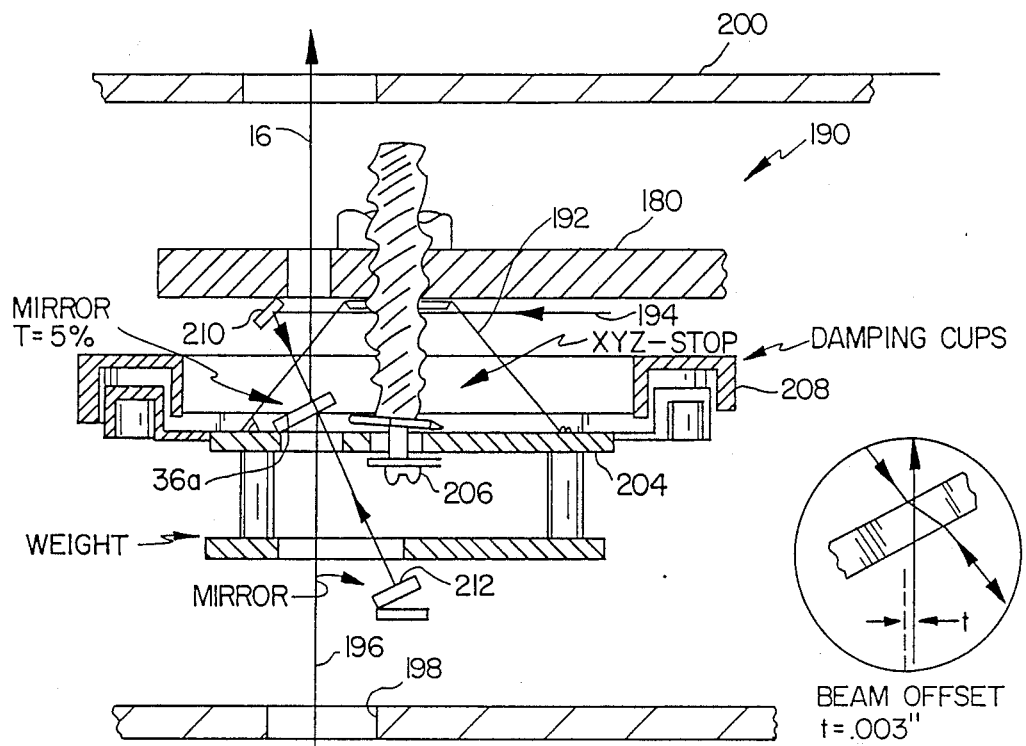
FIG. 11 is a schematic view in section, illustrating another tilt compensation system similar to that of FIG. 10, but with a tool locating feature as in FIG. 9.
Figure 12:
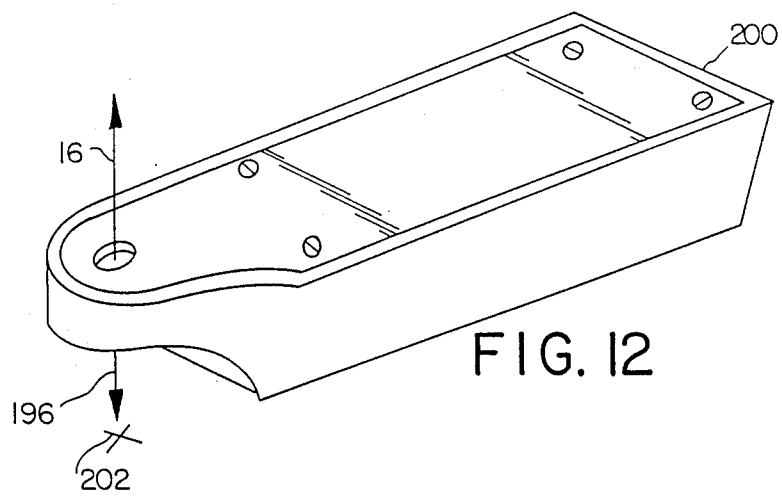
FIG. 12 is a view showing a modified form of tool housing which can include the tilt compensation systems shown in FIGS. 9 and 11.

FIGS. 10, 11 and 12 show further embodiments of a beam compensator assembly 172 in a modified form of tool 174 according to the invention. FIG. 10 shows a weighted pendulum 176 suspended by four wires 178, below a frame or housing plate 180 into which a threaded stop member 182 is screwed. Portions of the plate or frame member 180 are removed in FIG. 10 for clarity.

As can be seen from FIG. 10, the four-wire support allows the needed difference in compensation in the two orthogonal directions, for vertical reflection by a mirror 184. The tilt of the weighted pendulum 176 due to gravity in the plane which includes the two mounting screws 186 can be greater than the gravity tilt in the other direction, approaching one-to-one (again depending on the angle of mounting of the mirror 184). However, in the orthogonal vertical plane which includes the mirror 184, the gravity-responsive tilt will be less, due to the arrangement of the suspending wires 178. The position of wires 178 and the manner in which they are connected to the pendulum 176 can be controlled and calibrated so as to accurately correct for any tilt within the permissible range (e.g. 5 degrees).

The top number 122 passes through a central hole 188 in the pendulum, restricting only excessive motion of the pendulum under conditions of shock applied to the tool.

FIG. 11 shows a slightly modified tilt compensation arrangement 190 wherein suspension wires 192 are oriented differently from the embodiment of FIG. 10, but operating in substantially the same way. In this embodiment the incident beam 194 is split by a beam splitter mirror 36a similar to that shown in FIG. 9 with the same purpose and effect. A downwardly directed plumb locator beam 196 passes through a housing opening 198. The tool housing can be, for example, similar to the tool housing 200 shown in FIG. 12. The apparatus indicated in FIG. 9, as modifying the tilt compensation device of FIG. 3, can also be used in a housing such as shown in FIG. 12. This enables the user to accurately position the locator beam 196 over a spot 202 on a floor or other surface, with essentially unrestricted visibility.

In FIG. 11 a weighted pendulum 204 supports the tilted mirror 36a and is suspended by the floor wires 192. A motion stop 206 is included, similar to that shown in FIG. 10. Damping cups 208 interact with the pendulum structure 204 to damp the swinging motion of the pendulum 204. The incident beam 194 may approach the beam splitter mirror 36 via a mirror 210 supported from the plate 180, as shown. The beam splitter mirror 36a may have a transmission of about 5 percent, where the transmitted beam is reflecting off a mirror 212 below the pendulum.

Figure 13:
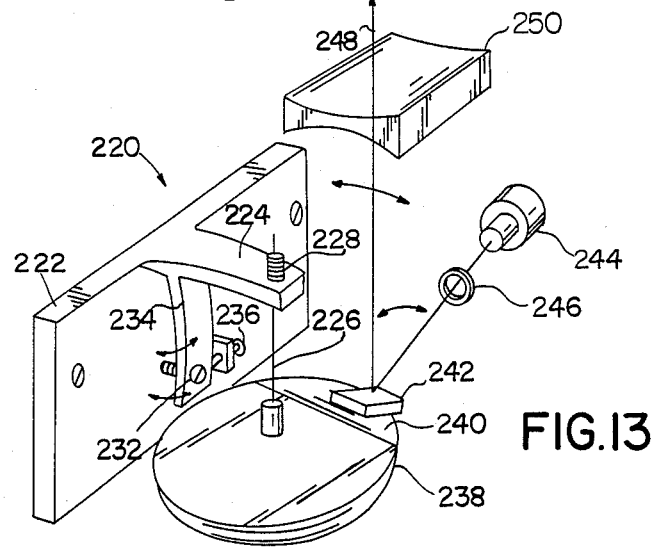
FIG. 13 is a schematic perspective view showing a further preferred form of tilt compensation apparatus for the tool of the invention.
Figure 14:
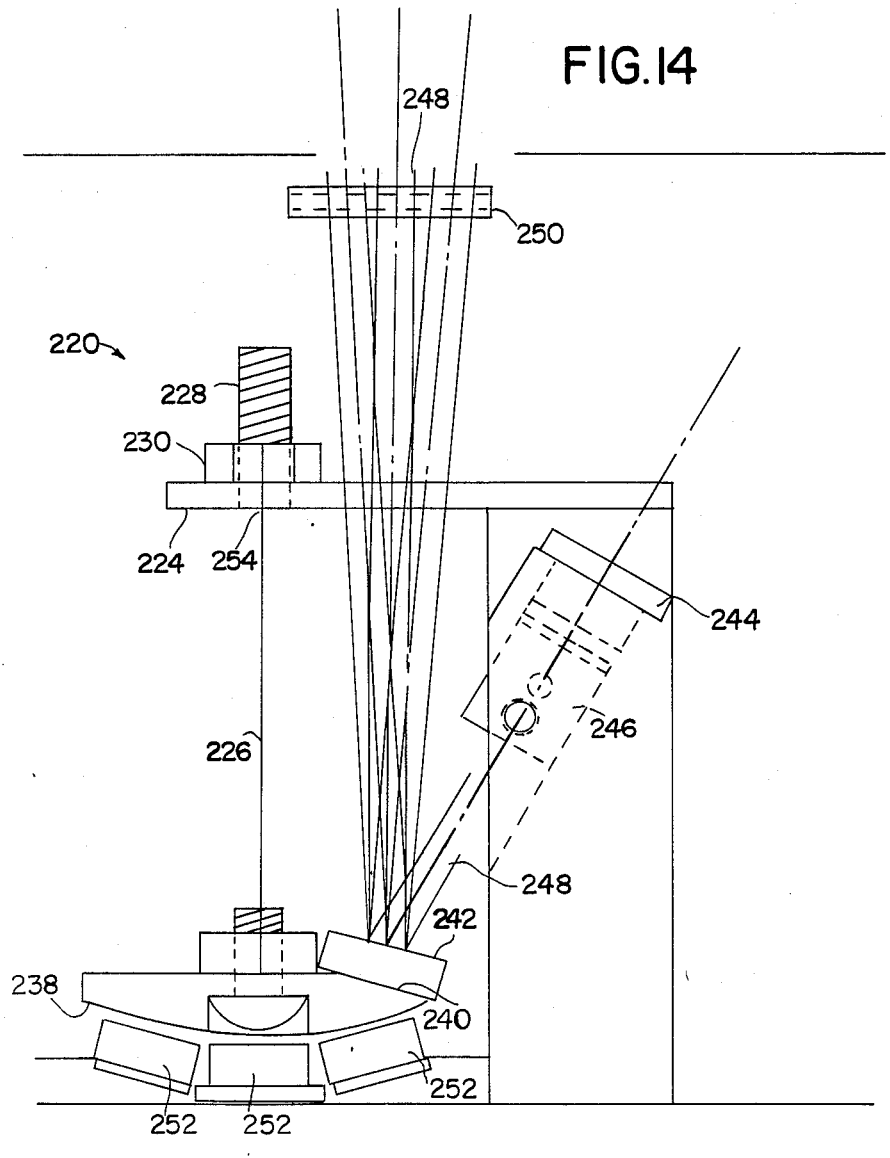
FIG. 14 is an elevation view of the apparatus of FIG. 13.

FIGS. 13 and 14 show a further important variation of a tilt compensation apparatus 220 in accordance with the present invention. This form of compensator can be used in the level/plumb indicator apparatus shown in FIGS. 1, 2 and 3.

The preferred embodiment shown in FIGS. 13 and 14 has a frame or base plate 222 secured to the instrument's housing, a cantilevered support arm 224 extending from the base plate, and a flexure wire or rod 226 supported from the support arm. As illustrated, the wire or rod 226 passes through a bore in the arm 224. It may be secured in any of several different ways, such as by a tightly fitting collar fitted into the hole, but in this preferred embodiment the wire 226 is secured by being brazed into a threaded member 228, which is then screwed into the hole in the support arm 224, which is threaded. A lock nut 230 may be included to secure the position of the male threaded member 228, as shown in FIG. 14.

The cantilevered arm 224 is adjustable to a limited degree in two orthogonal directions, to accurately calibrate a "zero" position. As shown in FIG. 13, a first screw 232 may be fitted through a slotted hole in a depending leg 234 which is integral with the support arm 224. Drawing the screw 232 down more tightly, into the baseplate 222, will draw the depending leg 234 toward the base plate and will bias the support arm 224 so as to tip the rod or wire 226 inwardly toward the baseplate. Backing the screw 232 off will have the opposite effect.

A similar adjustment is provided for the opposite orthogonal direction via a set screw 236 which bears against the a side edge of the depending leg 234. Rotation of the screw 236 will twist the leg 234 and the support arm 224 so as to dust the bias of the rod or wire 226 in the direction of movement parallel to the baseplate 222.

Other forms of calibration of the "zero" position of the wire 226 can be substituted for those shown.

In this embodiment the gravity/tilt responsive flexure member, i.e. the wire or rod 226, is preferably uniform in cross section and thus flexes evenly due to gravity in all directions. A pendulum or weighted platform member 238 hangs down from the supporting wire or rod 226, similarly to the weights or platforms described above with reference to FIGS. 2, 3, 4, 5 and 6. The weight or pendulum 238 has an appropriately angled facet or beveled surface 240 which supports a beam reflecting mirror 242. A laser diode 244 directs a laser beam through a focusing lens 246 onto the mirror 242. As in the above described embodiments, the mirror 242 moves under the influence of gravity on the weight or pendulum 238 to correct for out-of-level conditions of the tool. In the plane of the focused laser beam 248, which lies in the plane of the paper in FIG. 14, the mirror 242 makes a two-to-one correction of the outgoing reflected laser beam 248, compared to the degree of movement of the mirror in that plane. The stiffness of the suspending wire or rod 226 is selected to coordinate with the two-to-one correction of the mirror, so that the rod 226 essentially allows the mirror 242 and weight or platform 238 to swing half the arc which the weight would have a tendency to swing under the influence of gravity. The rod 246 can be calibrated or adjusted in this respect by slightly raising or lowering the wire in the supporting connection 228 (changing the length of wire available for motion), or by adding to or subtracting weight from the weighted platform 238.

As discussed above in connection with other embodiments of the tilt compensator, in the orthogonal out-of-plane direction or transverse direction, more mirror tilt correction is needed, since the laser diode beam approaches the mirror from an oblique angle. The lower the trajectory of the approaching beam 248 toward the mirror, the closer the mirror correction of the reflected beam approaches one-to-one. The higher the trajectory of the approaching beam, the closer the correction in this transverse plane approaches two-to-one relative to mirror movement.

At a high laser beam angle or trajectory as shown in FIG. 14, the correction actually effected by the mirror 242 might be in the range of about 1.90:1 to about 1.97:1. Thus, more correction is needed in this direction than what is afforded by the swingable mirror 242. In the above embodiments, the approach is generally to make the suspending flexure element more flexible in the out-of-plane or transverse direction than in the within-plane direction.

However, in this embodiment the suspending element 226 is a rod or wire of substantially uniform cross section in all directions, and of substantially uniform flexibility. The lesser mirror-effected correction in the transverse direction out of the plane of the incident and reflected beams is supplemented by a concave or negative cylindrical lens 250 as illustrated particularly in FIG. 13, mounted fixedly on the housing of the tool. The cylindrical lens 250 will not affect the orientation of the laser beam 248 in the plane of the incident and reflected beams, but it will supplement and enhance the correction in the transverse direction. Thus, if the weight or pendulum 238 swings to the right or away from the baseplate 222 as seen in FIG. 13, the reflected beam 248's mirror-induced correction will be to tilt the reflected beam toward the baseplate 222 but not quite sufficiently to fully compensate for the out-of-level condition of the tool. The cylindrical negative lens 250 will supplement this correction, by bending the reflected beam 248 further to the left or toward the baseplate 222 as seen in FIG. 13.

However, it can be seen from FIG. 14 that the correction by the mirror 242 within the plane of the incident and reflected beams will not be affected by the negative or concave lens 250. The trajectory of the laser beam 248 in this plane remains the same before and after it passes through the lens 250.

The focal length of the cylindrical lens 250 may be about 1.4 meters, in a preferred embodiment of the invention, for appropriate correction of the beam's angle in the transverse plane. Again, this focal length depends on the trajectory angle of the incident beam approaching the mirror 242, and the degree of shortfall of the correction made by the mirror 242 and weight or pendulum 238 in this plane.

As shown in FIG. 14, the movement of the pendulum or weight 238 preferably is damped by magnets 252 which are fixedly mounted on the tool or instrument. The weight or pendulum 238 preferably is shaped as a portion of a sphere in this preferred embodiment, which allows better magnetic damping. The bottom surface of the spherical weight 238 preferably has a curvature with a center at the top end 254 of the flexible wire or rod, so that the bottom of the pendulum remains essentially the same distance above the magnet in all positions. Five magnets 252 may be used, three of which are visible in FIG. 14.

Another feature of the preferred embodiment shown in FIGS. 13 and 14, and which can also be incorporated in the earlier described embodiments, is that the laser diode 234 and positive focusing lens 246 are mounted in the tool so as to orient the beam directly at the mirror 242, without the need for an initial redirecting mirror such as shown for example, at 34 in FIG. 2.

The concepts of pendulum tilt compensation embraced in the embodiments described above can also be applied to a liquid-filled vessel within which a float is restrained by a downwardly acting tension member. The float, immersed in the optically clear liquid, would carry the oblique mirror for directing the laser diode beam to true vertical (or true horizontal). A window or windows adjacent to the mirror can isolate the liquid-filled vessel from the diode and remaining optical components surrounded by air.

Terms such as "vertical" and "horizontal" as used in the above description should be read only in conjunction with the embodiment in the orientation illustrated. In the claims, the term "true orientation" is intended to mean generically either truly horizontal or truly vertical. The tool of the invention can be set up so as to primarily generate a truly horizontal, rather than a truly vertical beam, with means for directing to vertical when needed.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims:

We claim:

1. A device for projecting a plumb line or an alignment line, comprising,
   a housing capable of being placed on a generally horizontal surface,
   laser diode means for emitting a visible laser beam, mounted within the housing,
   battery means contained within the housing, for powering the laser diode means,
   optical means for receiving the light from the laser diode means and delivering a collimated light beam out of the housing, generally vertically upwardly,
   compensator means associated with the laser diode means and the optical means, for correcting for small tilt angles of the housing placed on said generally horizontal surface and for assuring that the beam from the optical means is oriented substantially vertically in spite of such small tilt angles, and
   a reference marker means associated with the housing, visible to a user when the housing rests on said surface, for aligning the vertical light beam with a desired position on said surface.

2. The device according to claim 1, wherein the housing is less than about ten inches in length.

3. The device according to claim 2, wherein the housing is less than about three inches in height.

4. The device according to claim 1, wherein the light beam emerging from the device is accurate to true vertical or true horizontal to within about ¼ inch at 30 feet.

5. The device according to claim 1, wherein the light beam projected from the housing has a power in the range of ½ to 5 milliwatts.

6. The device according to claim 1, wherein the compensator means comprises two-axis pendulum means supporting a final reflecting mirror in an oblique position, the mirror being positioned to receive a beam from the laser diode means and to reflect the beam vertically upwardly, and the two-axis pendulum means including gravity responsive means for effecting a first degree of mirror movement compensation generally within a plane including the beam incident and reflected from said final reflecting mirror on the first axis, and for effecting a second, different degree of mirror movement compensation in a generally transverse plane, on the second axis.

7. The device according to claim 6, wherein the two-axis pendulum means comprises a thin metal body including a generally horizontal cantilevered plate portion, a first flexure band portion in the form of a thin metal band depending vertically from the cantilevered plate, for bending in conjunction with the plate in response to gravity in a first-axis direction, a second flexure band portion extending downwardly from the first flexure band portion in the form of a thin metal band oriented at right angles to the first flexure band portion, and bendable in a second-axis direction generally perpendicular to the first-axis direction, and a weight portion connected at the bottom of the second flexure band portion, with the final reflecting mirror being fixed to the weight portion, the two-axis pendulum means being so calibrated as to respond appropriately to tilt of the housing by the force of gravity acting on the weight portion, in each respective axis direction to correctly compensate for the tilt of the housing in that direction and to keep the beam reflected from the final reflecting mirror substantially vertical.

8. The device according to claim 7, further including magnetic damping means acting between the weight portion and the housing for damping the two-axis pendulum means from swinging.

9. The device according to claim 8, wherein the magnetic damping means comprises a series of permanent magnets fixedly secured with respect to the housing, and the weight means comprises a copper member positioned near the permanent magnets.

10. The device according to claim 6, including means for calibrating said first degree of compensation by adjusting the length of cantilever of said cantilevered plate.

11. The device according to claim 1, wherein the reference marker means comprises beam splitter means for directing a locator portion of the light beam vertically downwardly, substantially in alignment with the beam projecting upwardly, and means associated with the housing for enabling a user to view the locator portion of the beam as it projects onto a surface on which the housing rests.

12. The device according to claim 11, wherein the housing has a cantilevered portion at one end containing the compensator means, the cantilevered portion being above the bottom of the housing and including a beam exit window for the locator portion of the beam, so that an open area exists below the cantilevered portion enabling the user to accurately position the locator beam on a desired point on the horizontal surface on which the housing rests.

13. The device according to claim 1, wherein the compensator means comprises a generally vertical flexure rod having a bottom end fixed with respect to the housing and having the laser diode means mounted at its upper end so as to project light upwardly, the flexure rod being bendable in response to tilt of the housing so as to laterally shift the position of the laser diode in response to such tilt, and a positive lens above the laser diode and fixed in position with respect to the housing, the lens being of proper focal length to collimate the laser light, whereby lateral shifting of the diode will shift the source of the light due to tilt, and the lens will reverse the direction of shift so that the collimated beam emerging from the lens remains substantially vertical in spite of tilt of the housing.

14. The device according to claim 1, wherein the compensator means comprises a first convex lens mounted on generally vertical flexure support legs above the laser diode which is fixed relative to the housing so as to project light upwardly, the flexure support legs being bendable so as to laterally shift the position of the first lens with tilt of the housing, so that the light from the diode is converged by the first lens and angularly tilted in the direction of tilt of the support legs, and further including a second convex lens positioned above the first lens and fixed with respect to the housing, the focal lengths and separation between the two lenses being such as to produce a collimated beam emerging substantially vertically upwardly from the second lens.

15. A device for projecting a plumb line, a level line or an alignment line, comprising,
   a housing capable of being placed on a generally horizontal surface,
   laser diode means for emitting a visible laser beam, mounted within the housing,
   battery means contained within the housing, for powering the laser diode means, optical means for receiving the light from the laser diode means and delivering a collimated light beam out of the housing, generally vertically upwardly, compensator means associated with the laser diode means and the optical means, for correcting for small tilt angles of the housing placed on said generally horizontal surface and for assuring that the beam from the optical means is oriented substantially vertically in spite of such small tilt angles, the compensator means comprising a generally vertical flexure rod or wire suspended from its upper end within the housing, and a gravity-responsive weighted pendulum connected at the lower end of the flexure rod, the pendulum supporting a final reflecting mirror in an oblique position, the mirror being positioned to receive a beam obliquely from the laser diode means and to reflect the beam generally vertically upwardly, and further including negative cylindrical lens means in the path of the beam reflected from the mirror, for increasing the tilt at the reflected beam relative to the housing in a plane at right angles to a plane in which the beams incident to and reflected from the mirror lie, increasing the correction in said plane at right angles and effecting substantially true orientation of the beam exiting the cylindrical lens means, a reference marker means associated with the housing, visible to a user when the housing rests on said surface, for aligning the vertical light beam with a desired position on said surface, and reflector means within the housing for redirecting said substantially vertical light beam to a substantially horizontal orientation when desired, including manual selector means on the outside of the housing for permitting the user to redirect the beam horizontally when desired.

16. The device according to claim 15, wherein the weighted pendulum is shaped generally as a portion of a sphere with an arcuate surface downward, and including pendulum motion damping magnets fixed in the housing just below the arcuate surface of the pendulum and generally equally spaced from said arcuate surface.

17. A device for projecting a plumb line, a level line or an alignment line, comprising, a housing capable of being placed on a generally horizontal surface, laser diode means for emitting a visible laser beam, mounted within the housing, battery means contained within the housing, for powering the laser diode means, optical means for receiving the light from the laser diode means and delivering a collimated light beam out of the housing, generally vertically upwardly, compensator means associated with the laser diode means and the optical means, for correcting for small tilt angles of the housing placed on said generally horizontal surface and for assuring that the beam from the optical means is oriented substantially vertically in spite of such small tilt angles, the compensator means comprising pendulum means supporting a final reflecting mirror in an oblique position such as to receive a beam from the laser diode means and to reflect the beam generally vertically upwardly, and the pendulum means including gravity-responsive means for effecting tilt of the mirror tending to correct the reflected beam when the housing is out of level but not fully compensating for housing tilt in a plane perpendicular to a plane containing the beams incident to and reflected from the mirror, and further including negative cylindrical lens means in the path of the beam reflected from the mirror, for increasing the tilt of the reflected beam relative to the housing in said perpendicular plane, increasing the tilt compensation in said perpendicular plane to supplement the tilt correction afforded by the pendulum means and achieving substantially true orientation of the beam exiting the cylindrical lens means, a reference marker means associated with the housing, visible to a user when the housing rests on said surface, for aligning the vertical light beam with a desired position on said surface, and reflector means within the housing for redirecting said substantially vertical light beam to a substantially horizontal orientation when desired, including manual selector means on the outside of the housing for permitting the user to redirect the beam horizontally when desired.

18. The device according to claim 17, wherein the pendulum means and gravity-responsive means include a weighted pendulum supporting the final reflecting mirror and a flexure rod supporting the weighted pendulum, the flexure rod being substantially uniform in cross section such that it deflects the position on the pendulum substantially equally in all directions.

19. The device according to claim 1, further including reflector means within the housing for redirecting said substantially vertical light beam to a substantially horizontal orientation when desired, including manual selector means on the outside of the housing for permitting the user to redirect the beam horizontally when desired.

* * * * *